Aug. 10, 1926. 1,595,696
H. R. WAKEFIELD ET AL
BREAD SLICING MACHINE
Filed Dec. 26, 1922 6 Sheets-Sheet 2

Aug. 10, 1926.

H. R. WAKEFIELD ET AL 1,595,696

BREAD SLICING MACHINE

Filed Dec. 26, 1922 6 Sheets-Sheet 4

Inventors
H. R. Wakefield
E. Terry
J. Rowlatt
by Connolly Bros
Attorneys

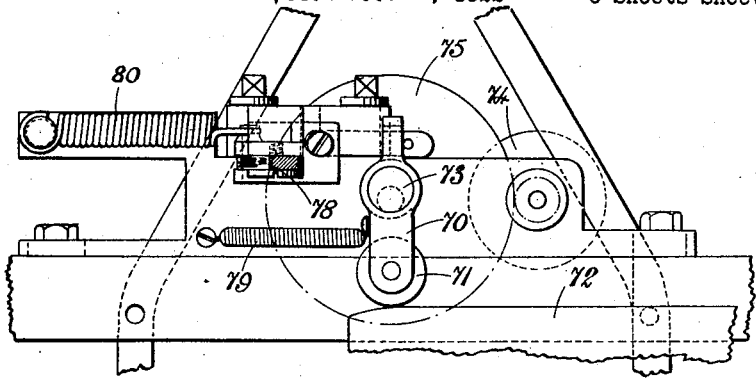
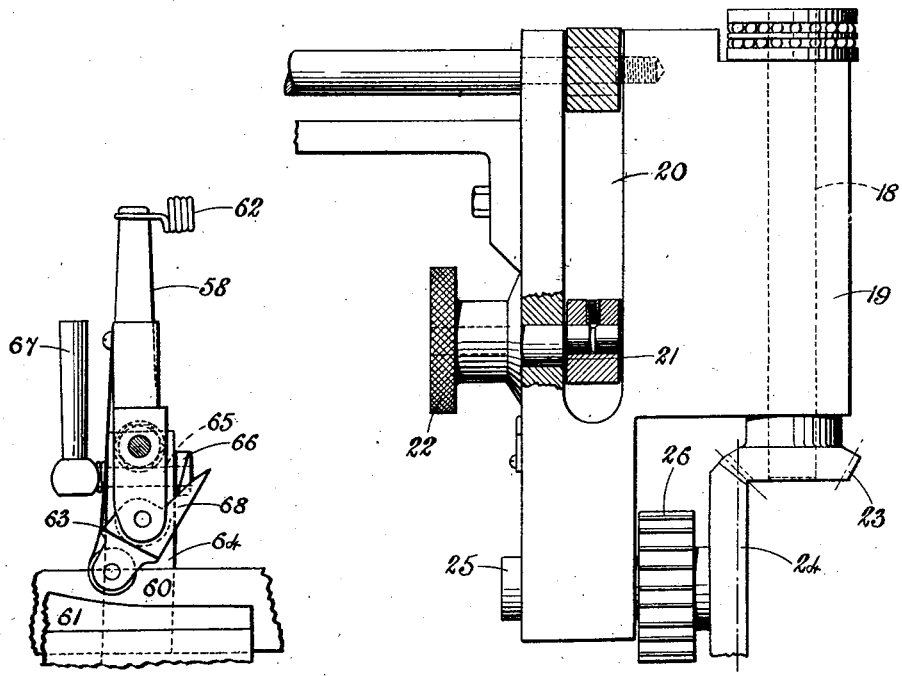

Patented Aug. 10, 1926.

1,595,696

UNITED STATES PATENT OFFICE.

HAROLD ROBERT WAKEFIELD, EDGAR TERRY, AND JAMES ROWLATT, OF LEICESTER, ENGLAND, ASSIGNORS TO THE "HARBORO" MACHINERY COMPANY LIMITED, OF LEICESTERSHIRE, ENGLAND, A BRITISH COMPANY.

BREAD-SLICING MACHINE.

Application filed December 26, 1922, Serial No. 609,023, and in England January 5, 1922.

This invention relates to bread slicing machines and has for its object an improvement in the construction of such machines whereby they may be used for slicing bread and also for buttering, i. e. spreading with butter the surface of each slice as it is cut or severed from the loaf.

In a machine constructed in accordance with the invention, a vertically disposed or upright bread holder is traversed or reciprocated relatively to a cutter, and likewise to a butter apparatus when each slice is to be buttered while being cut.

The bread holder may be in the form of a four sided box or frame provided therein with a vertically movable floor to support the bread, said floor having combined therewith, means for imparting an upward step-by-step movement to the loaf, at each traverse of the bread holder, so that the top end of the loaf is raised a slice thickness preparatory to slicing.

Means are also provided for automatically carrying away and stacking or piling the slices after they have been cut off.

The buttering apparatus comprises a receptacle to contain the butter in bulk, and means to compress the butter and cause it to extrude through a feed orifice into the path of the bread. Auxiliary means are furnished to separate a portion of the butter from the stock at each traverse and force it to extrude through the feed orifice.

In order that our invention and the application of the same may be clearly understood, reference is made to the accompanying drawings, in which:—

Figure 7 is a sectional rear elevation of Figure 5, showing the mechanism for operating the shutter.

Figure 8 is a detail view, showing the operation of the cut-out mechanism for the butter feed, and Figure 9 is a detail view of the eccentric mechanism for raising and lowering the cutting means.

Figure 1:
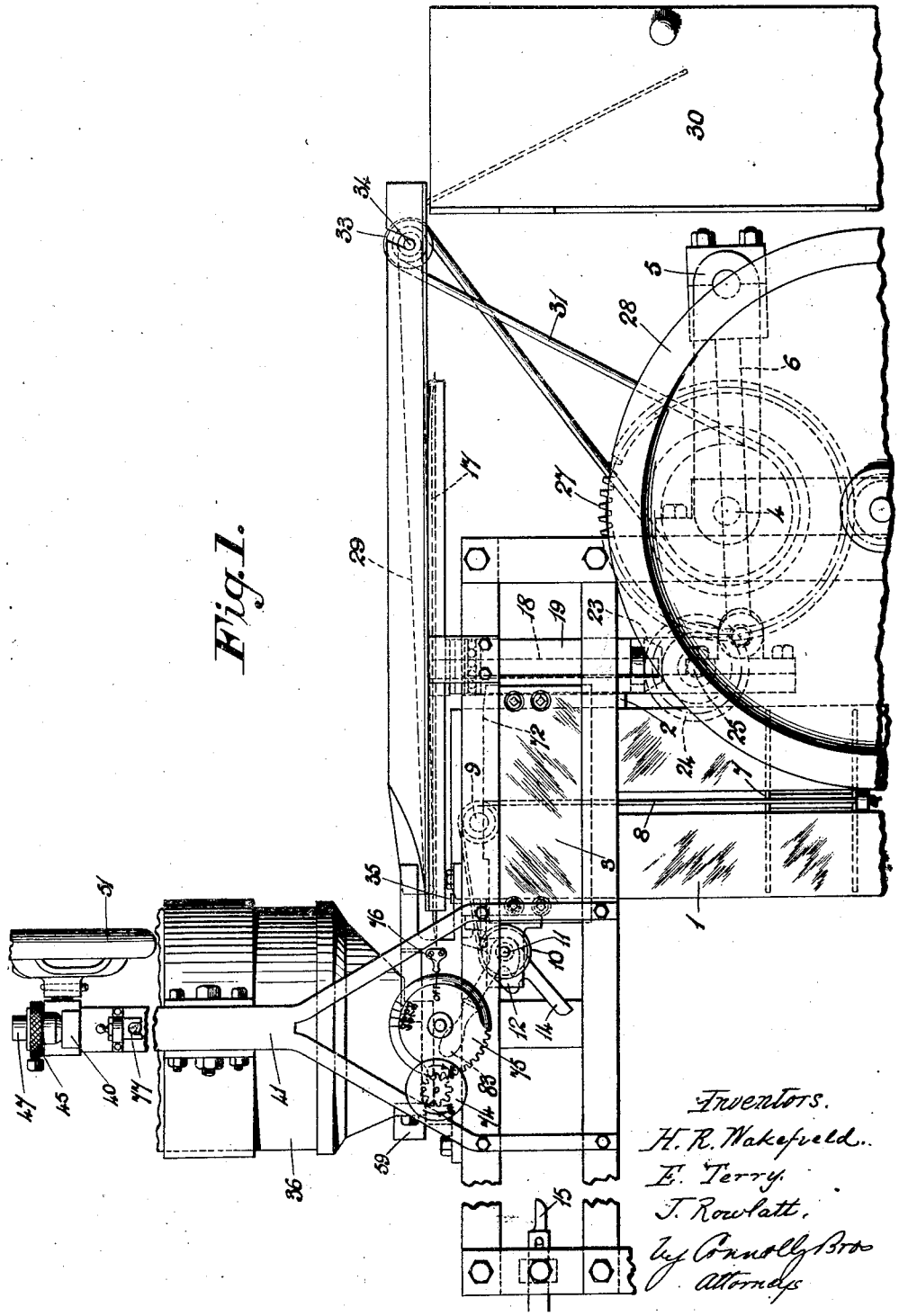
Figure 1 is a front elevation of the machine.
Figure 2:
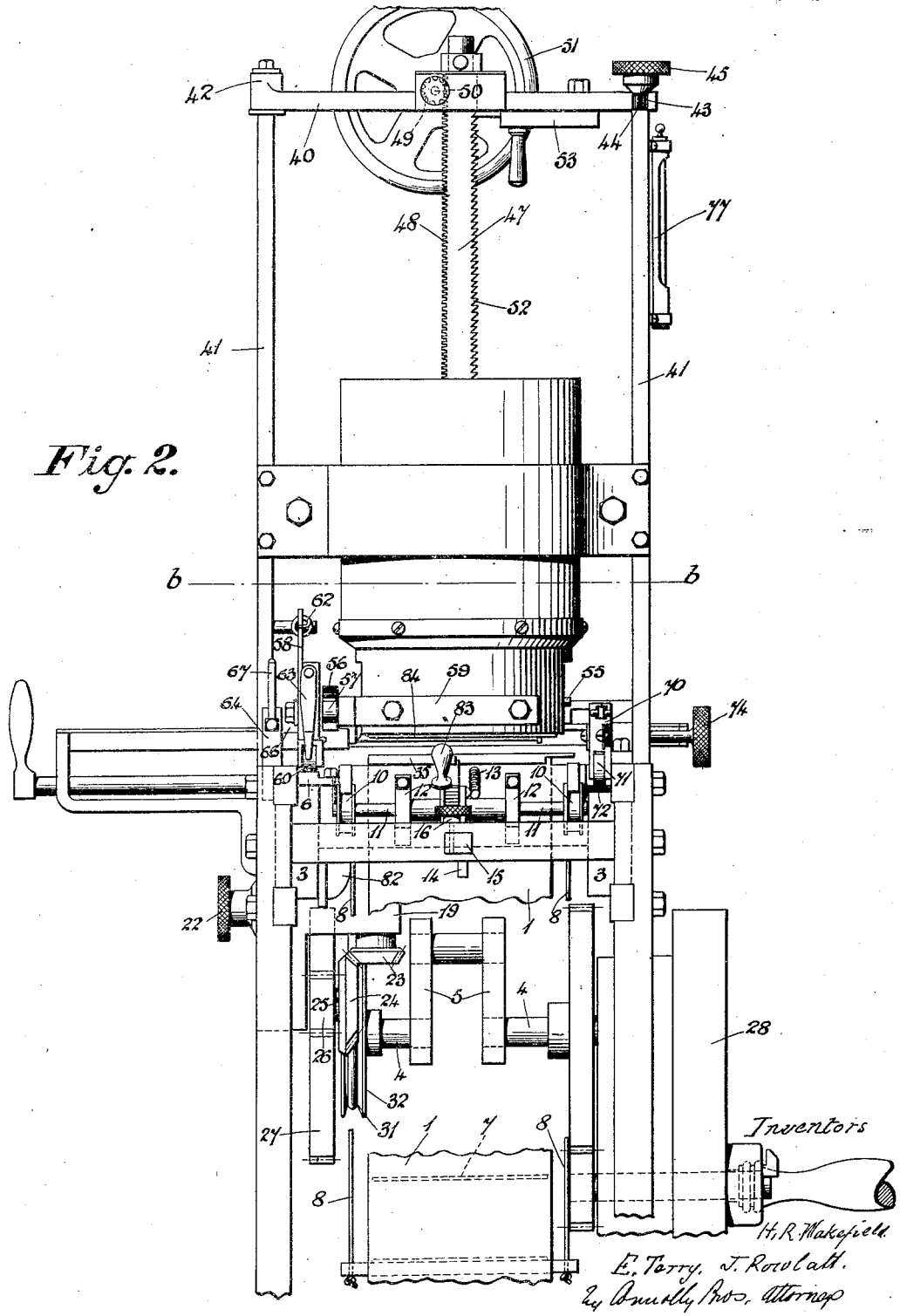
Figure 2 is an end view.
Figure 3:
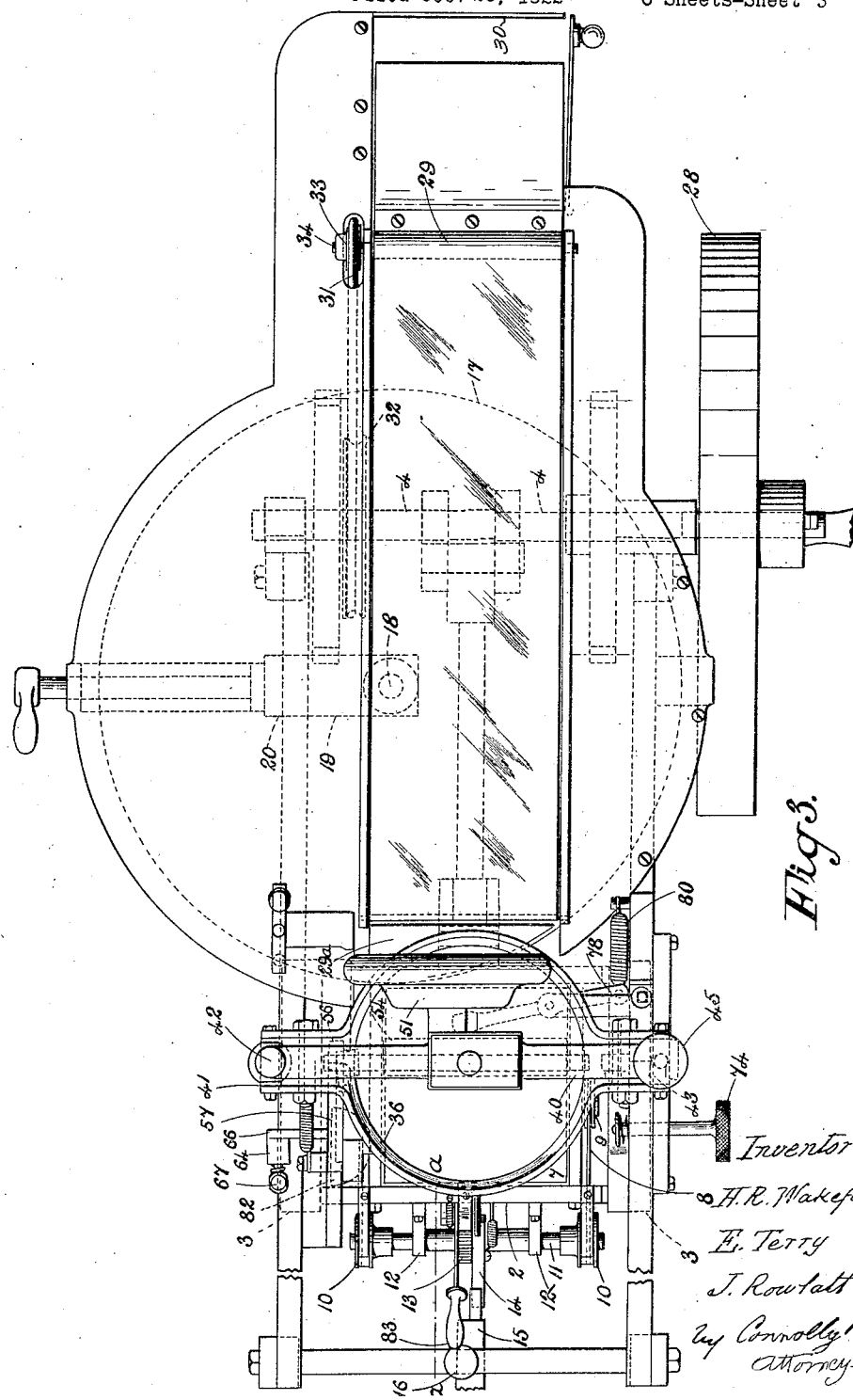
Figure 3 is a plan thereof.
Figure 4:
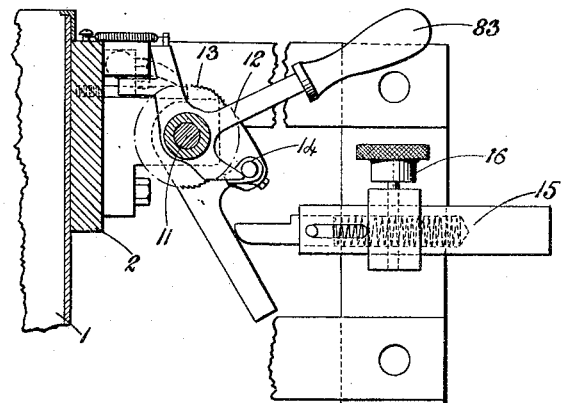
Figure 4 is a vertical section on the line a—a of Figure 3.

In a machine constructed in accordance with this invention the bread stock, in the form of a loaf, is carried in a vertically disposed or upright bread-holder 1 traversed or reciprocated on a carriage or frame 2. The said bread holder 1, which may be in the form of a four sided box or frame, is formed with a loose bottom 7, capable of being raised a predetermined distance at each traverse to project the upper end of the loaf a corresponding distance, equal to the thickness of the slice to be cut, above the top open end of the said holder. Conveniently the frame or carriage 2 of the said bread holder, is at each side secured to a slide, block or equivalent 3, arranged to move to and fro in a guideway, formed on each side of the frame of the machine.

The traversing bread holder receives its motion from the main or driving shaft 4 of the machine and suitable connections interposed between the said shaft and the bread holder frame, an example of which comprises a crank 5 and a connecting rod 6 united thereto and to the holder frame 2.

For imparting an upward step-by-step movement to the loaf, the floor or bottom 7 of the holder upon which the loaf rests, and hereafter designated the bread support is provided at each side with a flexible cord, cable or equivalent 8, adapted to be wound up intermittently to elevate the bread support and the loaf thereon.

By preference the cord or cable 8 is connected at one end to each end of the bread support 7 and passes over guide pulleys 9 to winding drums 10 located one on each side of a rotating spindle 11 mounted in bearings 12 on the holder frame 2.

The said spindle 11 is intermittently rotated by a ratchet wheel 13 thereon deriving motion from a spring trip lever pawl 14 which, as the bread holder reaches the limit of its return traverse movement from the cutter 17, makes contact with a fixed stop 15 which actuates the said pawl and moves the ratchet forward a distance determined by the height the loaf is to be raised for the slice thickness.

The said stop is connected to the frame of the machine and can be adjusted to project a longer or shorter distance into the path of the said trip lever to cause the latter to move the ratchet more or fewer teeth forward as desired and correspondingly vary the slice thickness. The stop is held in position by the insertion of a pin 16 into holes formed therein.

The cutting or slicing mechanism comprises a circular rotating knife 17, the edge of which, when the empty holder is brought to it, normally projects slightly over the edge of the upper part of said holder.

The said rotary knife is horizontally disposed relatively to the bread holder and is arranged on the upper end of a short spindle 18 carried in a bearing formed in a slide or block 19, capable of being raised in a guideway 20 formed therein to adjust the knife relatively to the upper end of the bread holder.

The adjustment of the said slide or block may be effected by an eccentric 21 operable by a milled nut or equivalent 22 on the exterior of the framing.

The knife is rotated by a bevel gear wheel 23, on the opposite end of the spindle 18 upon which said knife is mounted, and the said gear wheel engages a larger bevel gear wheel 24 carried on a spindle 25 receiving motion from a small spur wheel 26 thereon driven by a larger spur wheel 27 mounted on the driving shaft 4.

Upon the machine being set in motion by the turning of a handwheel or belt driven pulley 28 on the driving shaft 4, the knife is caused to rotate and the bread holder is reciprocated to and fro relatively to the knife and passes completely under the knife so that the latter can separate or slice off the thickness of the bread which projects above the upper edge of the said holder. Such slice when separated from the stock or loaf slides on to a traveling band 29 by means of an adjustable conveyor plate 29ª, which conveys the slice into a box or other suitable receptacle 30.

Motion is imparted to the said traveling band by means of a cord or belt 31 which travels between a pulley 32 mounted on the main shaft and a smaller pulley 33 mounted on a roughened or knurled spindle 34 around which the band travels.

The bread holder as hereinbefore described, is four sided to fit the loaf to be cut up, and the said sides rigidly hold the loaf in an upright position. In order to ensure a clean shear cut, an adjustable shearing plate 35 is mounted on the rear side of the open end of the bread holder, which presses up against the loaf. This plate is to be slightly movable vertically in order to accommodate a thicker or thinner slice of bread.

A machine constructed in accordance with this invention may also include as an important feature a butter apparatus combined with the mechanism hereinbefore referred to, by which each slice of bread is coated with butter as it passes under the buttering mechanism with sufficient close contact as to become coated with the butter exuding therefrom.

The buttering mechanism comprises a receptacle 36 for the stock or main supply of butter, the said receptacle being preferably in the form of a stationary upright cylinder, hereinafter referred to as the stockpot, rigidly connected to the frame of the machine, and located above the cutter and bread holder.

The said stock-pot is contracted in diameter at its lower end in which an aperture 37, preferably in the form of a narrow longitudinal slot, is formed through which separated portions of the butter are extruded into the path of the bread slice, which, as it passes thereunder, gathers the extruded butter and has its surface spread or coated thereby.

The said stock-pot is provided with means for initially compressing the butter therein prior to the machine being started in operation and such means permit of the pressure being regulated or continued therein as the butter is used.

Such means may conveniently consist of a piston 38 the integral vertical rod 39 which is carried by a crossbar 40 supported at each end on a pillar 41 rising from, and rigidly secured to the frame.

A preferred form is such that the cross bar and the piston, when the latter is raised above the top or entrance of the stock-pot, can swing on one side to give free and unobstructed access to the opening and the interior of the stock-pot, for replenishing the supply of butter or for cleaning purposes.

To achieve this object one end of the said cross-bar is movably fulcrumed on a stud or the like 42 on its pillar while the opposite end of the said bar is furnished with an open slot 43 which embraces the threaded end 44 of its pillar upon which it can be secured by a screw nut or like means 45.

To enable the piston to exert the required downward pressure to condense the butter in the stock-pot, the piston rod is surrounded by a strong spiral spring 46 compressible between the piston and a sleeve 47 on the piston rod.

Means are provided to cause the said sleeve to compress the spring for the purpose named and such means may conveniently comprise a rack 48 formed on one side of the said sleeve in which gears a pinion 49 on the spindle 50 of a small handwheel 51 the rotation of which in one direction causes the pinion to lower the sleeve to compress the spring and piston, while the rotation of the handwheel and pinion in the opposite direction reduces the tension of the spring.

On the opposite side of said sleeve is another rack 52 with which a spring controlled detent 53 is normally kept in engagement to lock and prevent back motion of the sleeve during compression.

When the piston is to be raised the said detent is withdrawn by hand and kept out of engagement with its rack until the sleeve has risen and the spring has expanded to its position of inertia.

Auxiliary means are located inside at the bottom of the stock-pot to separate a portion of butter from the stock at each traverse of the bread holder, and force it to extrude through the feed orifice or aperture in the stock cylinder into the path of the upper face of the loaf which in its traverse, gathers it, and becomes coated therewith.

Figure 6:
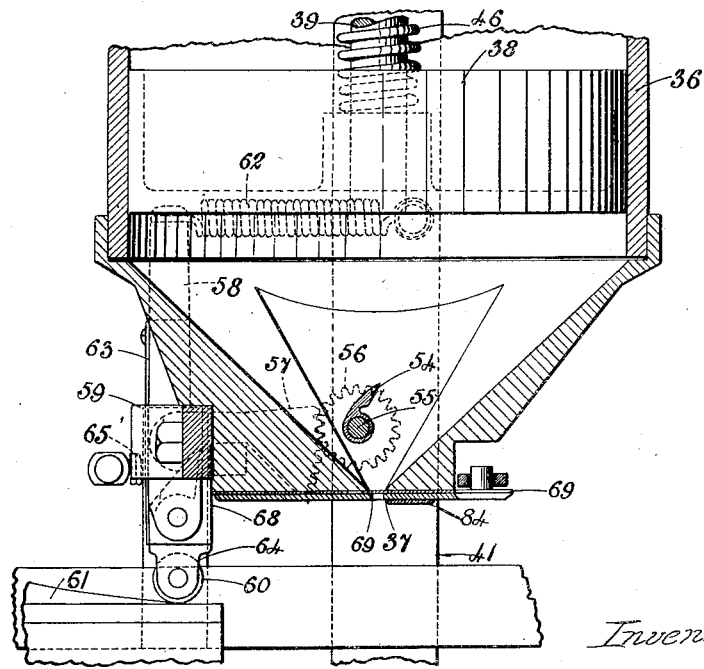
Figure 6 is a sectional front elevation of Figure 5, showing the mechanism for operating butter-feed.
Figure 5:
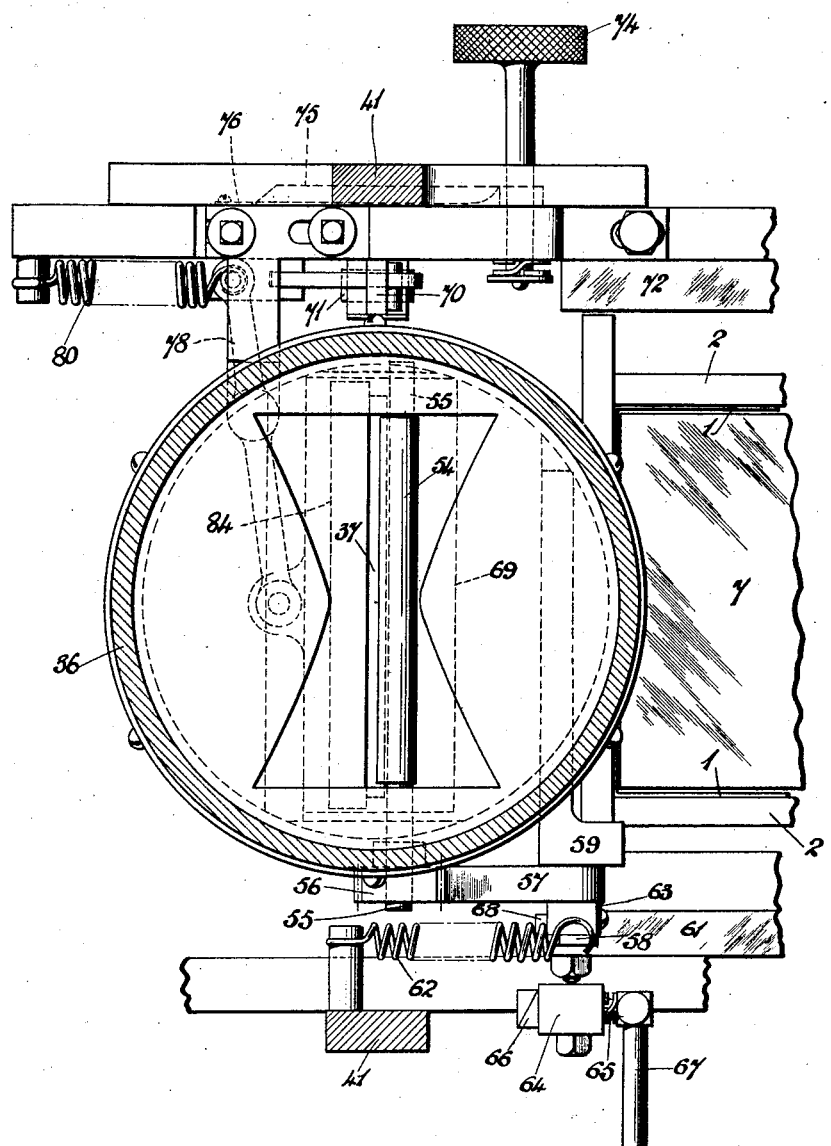
Figure 5 is a sectional plan of the stockpot, taken on line b—b of Figure 2, showing the mechanism for opening the slot thereunder, and also for forcing the butter therethrough.

A preferred form of separator or extruder is shown in Figures 5 and 6, in which it takes the form of a wiper or plate 54 carried on a transverse rock shaft 55 controlled by a spring or the like, so that it is normally maintained in a more or less upright position penetrating the lower portion of the butter stock, and normally returns to that position under the influence of the said spring after each rocking motion or descent to force a portion of the butter through the feed aperture.

The said rock shaft and wiper receive their motion for feeding purposes from a small spur wheel 56 on the end of the former engaged by a quadrant 57 formed on one end of a spring controlled lever 58, pivoted to a fixed part of the framing, preferably a bar or the like 59, mounted on the bottom end of the stock-pot, the other end of said lever being furnished with a truck or roller 60, located in the track of a cam 61 arranged on the slide block of the bread holder. At each traverse of the holder towards the knife and buttering mechanism, the said cam actuates the said lever and causes it to rock the shaft and the wiper or separator thereon, the latter thereupon detaches or separates a portion of butter and forces it through the feed orifice.

As soon as the cam passes out of contact with the lever, the spring 62, hereinbefore referred to, imparts a quick return motion of the rock shaft and wiper thereon.

The lever is furnished with a knuckle joint, so that on the return journey of the cam, it yields and allows the cam to pass thereunder without actuating it, and the roller is kept in its normal downward position by a flat spring or the like 63, fastened to the lever.

When the machine is being used for cutting bread and not buttering same, it is essential that the rocker shaft and wiper thereon should not operate, and to prevent this a cut-out for the lever and roller is provided. A convenient form of such cut-out is shown in Figure 8 and comprises a block 64, fastened to the framing, having loosely mounted therein a rod or spindle 65, to one end of which a bar 66 is rigidly attached. A handle or lever 67 is attached to the opposite end of the said spindle. The lever 58 is provided with an extension 68 behind which the bar 66 falls upon the handle 67 being operated, thus swinging the roller upwards to clear the cam track 61.

The feed slot or orifice 37 is normally kept closed by means of a shutter or plate 69 which is located underneath the said orifice, and such shutter is movable thereunder by a spring controlled lever 70 (Figure 7), having mounted thereon, a truck or roller 71 which is operated by a cam 72 disposed on or forming part of the bread holder slide block. The lever 70 is mounted upon an eccentric 73, which latter can be turned by a disc 75 (Figures 1, 5 and 7) gear actuated from an adjacent milled disc 74 (Figures 1, 2, 3 and 7) operable by hand.

Upon the disc 75 being turned in one direction, the eccentric lifts the roller 71 clear of the cam track 72 when no butter is delivered, and on being turned in the other direction the roller is lowered a determined amount to vary the opening of the slot in the bottom of the stock-pot.

The disc 75, is, as shown in Figure 1, arranged on the front of the frame of the machine and has graduations thereon which when it is turned by the milled disc 74, move past a fixed pointer 76. The graduations correspond with those on a thermometer 77 and as the disc 75 is fast on the spindle of the eccentric 73, rotation of the said disc will vary the relation of the roller 71 to the cam 72 and correspondingly vary the movement of the shutter and the effective opening of the slot 37.

The consistency of the butter will naturally vary with the temperature of the room but by turning the disc 75 until that graduation thereon which agrees with the temperature indicated by the thermometer comes into register with the pointer 76, the shutter action can be regulated to give an opening suitable for the proper delivery of the butter.

The lever 70 is pivotally connected to a bell crank lever 78, the other end of which latter is connected to the shutter or slide and upon the truck or roller 71 riding along the cam 72, the said shutter is opened and as soon as the said cam passes out of contact with the roller a small spring 79 returns the lever 70 to its normal upright position, and a larger spring 80 closes the shutter. A bead 84 is provided on the under side of the stock-pot to ensure equal spreading of the butter on the bread.

When the movable floor or bread support has risen to the top of the bread holder, an attachment 81 thereon causes a bell 82 to ring, and a new loaf is then placed on the support. The pawl 14 which drives the ratchet wheel 13 from which the winding drums derive their motion is then withdrawn by a spring operated handle 83 from engagement with the said ratchet wheel, and by downward pressure on the loaf the bread support is free to be lowered with the loaf, into the bread holder, preparatory to such loaf being cut in the manner hereinbefore described.

Details of construction may be varied without departing from the scope of the invention.

What we claim then is:—

1. A bread slicing machine comprising, in combination, an upright bread holder, a frame along which said bread holder is slidable, means to traverse said holder to and fro along the frame, a butter apparatus, means therein operating intermittently to feed butter therefrom in separate portions as the bread holder passes said apparatus, and a rotary knife to cut a slice of bread at each stroke of the holder.

2. A bread slicing machine comprising, in combination, an upright bread holder, a knife, a buttering apparatus, and means to traverse the bread holder relatively to said knife and buttering apparatus, the latter consisting of a stock-pot to contain butter in bulk, means to forcibly extrude butter through a feed orifice in the bottom of the stock-pot, a shutter to adjust the area of said orifice and a hand operated device and intermediate connections for moving said shutter.

3. A bread slicing machine comprising, in combination, an upright bread holder, a cutter, a buttering apparatus, means to reciprocate the bread holder relatively to the cutter and buttering apparatus, a slide carrying said cutter, a guideway along which said slide is movable for adjusting the cutter relatively to the bread holder, an eccentric for moving the slide, and a hand operable device for moving the eccentric.

In testimony whereof we affix our signatures.

HAROLD ROBERT WAKEFIELD.
EDGAR TERRY.
JAMES ROWLATT.